April 25, 1950   B. B. HOLMES   2,505,118
PRESSURE GAUGE
Filed Dec. 26, 1944   2 Sheets-Sheet 1
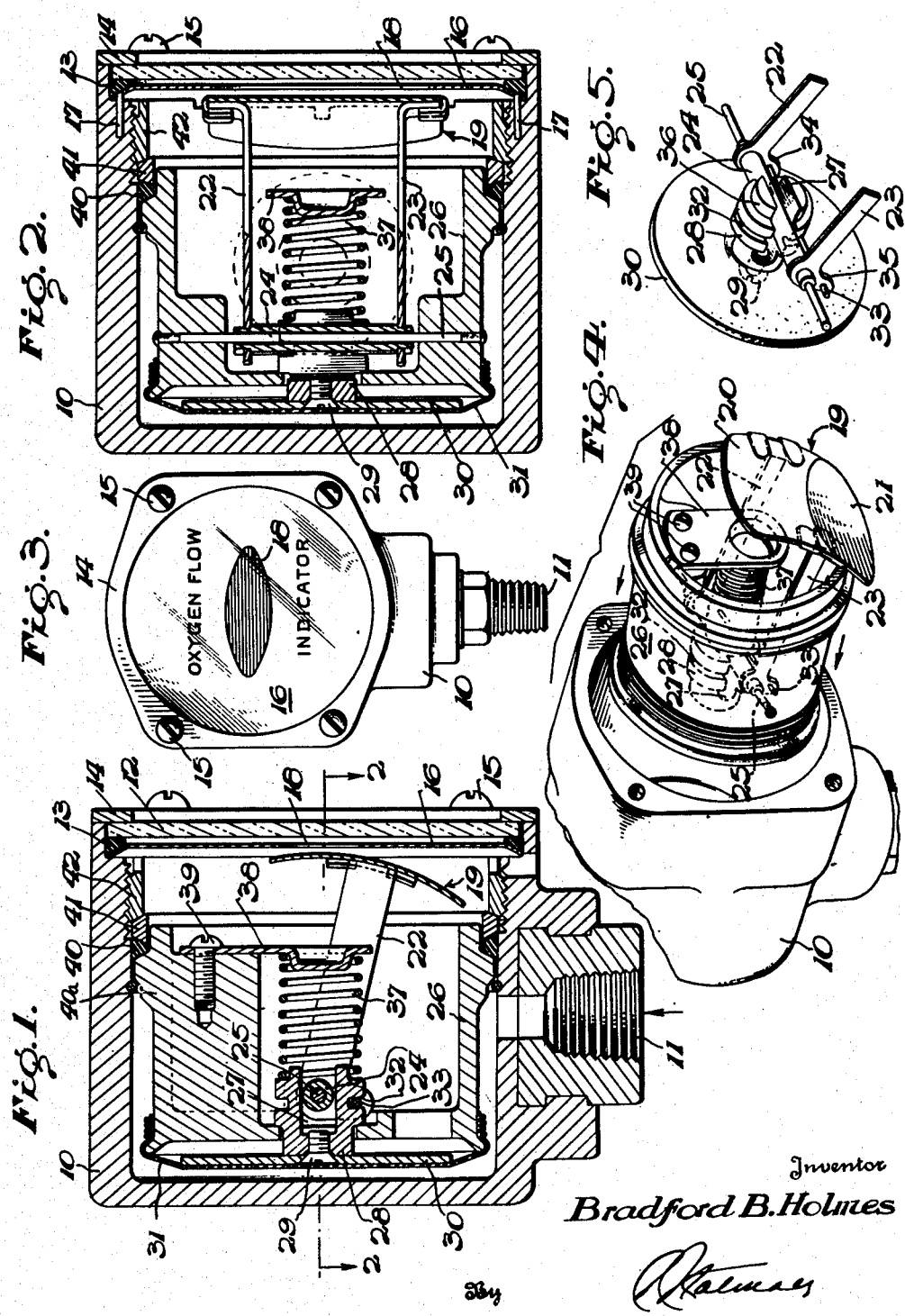
Inventor
Bradford B. Holmes April 25, 1950     B. B. HOLMES     2,505,118
PRESSURE GAUGE
Filed Dec. 26, 1944     2 Sheets-Sheet 2
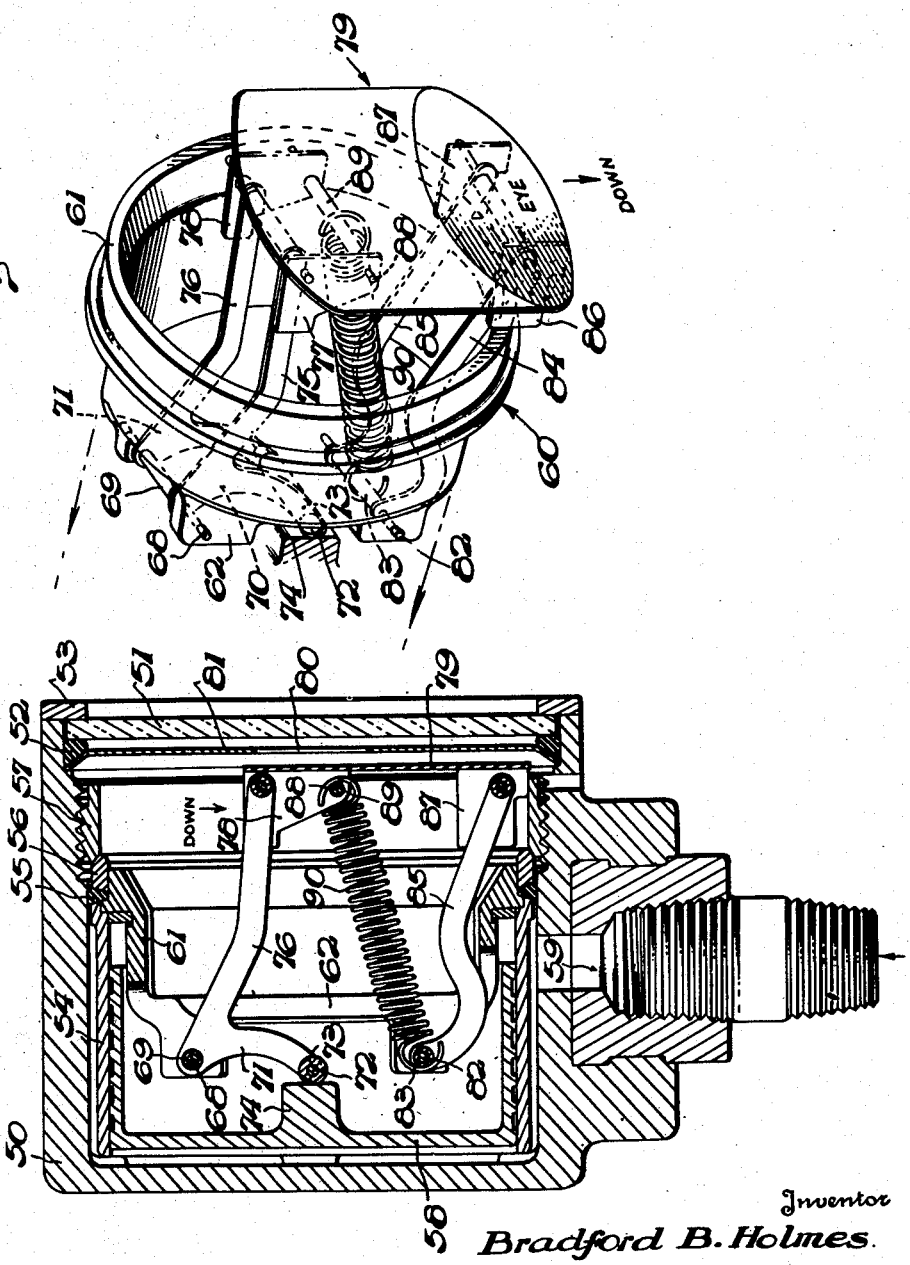
Inventor
Bradford B. Holmes.
By
Attorney Patented Apr. 25, 1950

2,505,118

UNITED STATES PATENT OFFICE 2,505,118

PRESSURE GAUGE

Bradford B. Holmes, New York, N. Y., assignor to Bendix Aviation Corporation, Teterboro, N. J., a corporation of Delaware Application December 26, 1944, Serial No. 569,777

7 Claims. (Cl. 116—117)

This invention relates to pressure responsive and indicating instruments generally and more particularly to oxygen flow indicators, commonly referred to as blinker gauges.

With the use of oxygen regulators of the demand type, shown and described in copending application Serial No. 482,016, filed April 6, 1943, when the oxygen supply has been depleted, the user, upon inhaling will draw in air through the venturi of the regulator and not be aware that he is not being supplied with oxygen. Inasmuch as pressure is built up behind the injector nozzle of such a regulator and exists there only when oxygen actually flows, an indicator may be coupled thereto and thereby provide the user with an indication of oxygen flow. Such an indicator, however, cannot be too sensitive because in exhaling into a mask, connected to the regulator, an inch or two of water pressure is built up which would act on the indicator through the injector nozzle. A reasonable requirement, therefore, is that such an indicator should not function below four inches of water pressure and thereby avoid false indications when exhaling. Relatively large indicators of this character have been provided, heretofore, utilizing Sylphons. However, these are not only large in size but also complicated in character and require considerable attention.

An object of the present invention, therefore, is to provide an improved and novel oxygen flow indicator.

Another object of the invention is to provide a novel blinker gauge or oxygen flow indicator which is relatively small in size and embodies a minimum number of parts, thereby adapting it to ease in manufacture and assembly.

Other and further objects and advantages of the invention will appear more fully hereinafter from a consideration of the detailed description which follows, taken together with the accompanying drawings. It is to be expressly understood, however, that the drawings are for purposes of illustration only and are not designed as a definition of the limits of the invention.

In the drawings wherein like reference characters refer to like parts throughout the several views, Figure 1 is a side elevation view in section of the novel oxygen flow indicator of the present invention;

Figure 2 is a section view taken substantially along the line 2—2 of Figure 1;

Figure 3 is a front elevation view, in substantially its actual size, of the indicator of Figures 1 and 2;

Figure 4 is a somewhat enlarged perspective view of the operative mechanism of Figures 1–3, inclusive;

Figure 5 is a fragmentary detail view of a portion of the structure of Figure 4;

Figure 6 is a side elevation view of a slightly modified form of the oxygen flow indicator of the present invention; and, Figure 7 is a perspective view of the operating mechanism of the indicator of Figure 6.

Referring now to the drawings for a more detailed description and more particularly to Figure 1 thereof, the novel oxygen flow indicator or blinker gauge of the present invention is shown as comprising a housing 10 having an oxygen inlet 11 and at its open end closed by way of a cover glass 12 interposed between a sealing ring 13 and a bezel 14 attached to the front of the housing by way of suitable screws 15. A dial 16 is arranged within the housing to abut sealing ring 13 and is secured to the housing by way of pins 17 (Figure 2), the dial, moreover, being provided with an oval-shaped opening 18.

Arranged for reciprocal motion relative to and behind opening 18 of the dial is an indicator plate or blinker, generally designated by the reference character 19, which is desirably divided, as better shown in Figure 4, into two color contrasting sections 20 and 21, one of which may be painted black, for example, and the other of which may be radium painted so that the change in color manifested during motion of the plate or blinker 19 relative to opening 18 of the dial in a manner to be fully set forth causes the desired indication.

Indicator or blinker 19 is connected to a yoke having two arms 22 and 23 which extend rearwardly and at their free ends support a hollow bushing 24 sleeved about a shaft 25 journalled at both of its ends within the wall of a hollow inner casing 26 arranged within housing 10. Bushing 24 is received within a slot 27 of a block 28 whose one end is secured by way of a suitable screw 29 to a stiff plate 30 resting against a resilient or yieldable wall 31 stretched across the open end of inner casing 26, the outer side of the wall being exposed to oxygen entering the interior of housing 10 by way of inlet 11.

Block 28, better shown in Figure 5, is provided with a peripheral groove 32 which accommodates a pin 33 therein, the latter passing through apertures formed in extending fingers 34 and 35 secured to or formed integrally with the outer ends of arms 22 and 23. The free end of the block is further provided with a reduced portion 36 which receives one end of a coil spring 37, the opposite end of which abuts a plate 38 secured to inner casing 26 by way of suitable screws 39. The interior of casing 26 is suitably sealed from the interior of housing 10 by way of a sealing member in the form of a rubber gasket 40 and a retainer ring 41, the latter being urged against member 40 by way of a spacer ring 42. The casing 26 abuts against a split snap ring 40a which is positioned in an annular groove in the casing 10 and which serves to fix the casing 26 in proper position within casing 10 and provides the necessary abutment so that the gasket 40 may be compressed to form a tight seal when the retainer ring 41 is urged against the gasket 40 by the spacer ring 42.

In operation, as oxygen enters housing 10 through inlet 11 and to the rear of wall 31 the latter is urged inwardly to move block 28 forwardly therewith against the action of spring 37. Motion of the block displaces pin 33 which pivots arms 22 and 23 about shaft 25 to thereby lift indicator or blinker 19 relative to opening 18 of dial 16. On exhaling the oxygen, the demand valve of the regulator is closed, as explained in the above-mentioned copending application, so that no oxygen flows at inlet 11 whereupon spring 37 urges block 28 and wall 31 rearwardly. Pin 33 is moved in an opposite direction, to pivot arms 22 and 23 downwardly to move blinker 19 downwardly relative to the dial opening.

In place of the oxygen flow sensitive wall 31, a piston and cylinder arrangement may be provided for generally the same purpose and to this end reference is made to Figures 6 and 7, wherein is shown a gauge of the character described above generally comprising a housing 50 having its open end closed by means of a cover glass 51 interposed between a sealing ring 52 and a bezel 53 suitably fastened to housing 50.

Arranged within the housing is a cylinder 54 which is held in place by way of a sealing ring 55 and a retainer member 56, the latter being held against a threaded spacer element 57. Mounted for reciprocal motion within cylinder 54 is a relatively light piston 58, clearance being provided between the rear of the cylinder and the housing as well as between its peripheral wall and the housing so that oxygen entering the housing by way of an inlet 59 is adapted to act on the outermost end of the piston.

An indicator assembly, generally designated with the reference character 60 and better shown in Figure 7, is mounted within the housing to enter into cylinder 54 and comprises a second cylinder 61 which is held in place by way of sealing ring 55 and retainer member 56. Secured to or formed integrally with cylinder 61 is a bracket 62 having journalled therein a shaft 68. A spacer roller 69 is sleeved about shaft 68 and pivotally mounted on shaft 68 between spacer 69 and the bracket are two arms 70 and 71 which at their lowermost ends support a pin 72 having a roller 73 sleeved thereon and adapted for engagement with an abutment 74 formed as a part of piston 58. Arms 70 and 71, moreover, are an integral part of a yoke member having extending arms 75 and 76 to which is fastened by way of plates 77 and 78 the upper end of an indicator or blinker plate 79, similar in all respects to blinker plate 19 of Figure 4, the blinker being adapted for substantially linear motion relative to opening 80 of a dial 81 interposed within housing 50 between sealing ring 52 and a flange of the housing, the arrangement being the same as that shown in Figure 3.

The lower portion of bracket 62 supports a pin 82 having a spacer 83 thereon, a pair of arms 84 and 85 being mounted for pivotal motion about pin 82. Arms 84 and 85 are provided at their free ends with plates 86 and 87 secured to the bottom portion of blinker plate 79. Plates 77 and 78 support a pin 88 having a spacer 89 thereon which has anchored to it one end of a coil spring 90, the opposite end thereof being anchored to spacer 83 of pin 82. In the absence of oxygen flow at inlet 11, the spring 90 acts to pull arms 75, 76 downwardly to pull blinker plate 79 to the position shown in Figure 6 and simultaneously urges arms 70 and 71 outwardly whereby roller 73 urges piston 58 to its outermost position relative to cylinder 54.

In operation, assuming oxygen flow at inlet 59, pressure develops behind piston 58 to urge the piston inwardly relative to cylinder 54. Motion of the piston carries abutment 74 forward whereupon arms 70 and 71 are pivoted about shaft 68 thereby raising arms 75, 76 and 84, 85 upwardly to carry plate 79 therewith relative to opening 80 of dial 81. Upward movement of arms 75 and 76 stresses spring 90 and, following closure of the oxygen demand valve in response to user exhalation, spring 90 urges arms 75 and 76 downwardly and piston 58 outwardly through arms 70 and 71.

It will now be apparent to those skilled in the art that a novel and improved oxygen flow indicator or blinker gauge has been hereby provided which is relatively small and compact and which embodies a minimum number of parts facilitating its manufacture and assembly.

Although but two embodiments of the invention have been illustrated and described in detail, various changes in the form and relative arrangement of parts which will now appear to those skilled in the art may be made without departing from the scope of the invention. Reference is, therefore, to be had to the appended claims for a definition of the limits of the invention.

What I claim is:

1. A gas flow indicator comprising a casing having a gas inlet, a dial having an opening therein and mounted at the front of said casing, pressure responsive means movably mounted in said casing and comprising a single wall only which is exposed to and actuated by flow of gas through said inlet, a yoke member pivotally mounted in said casing and arranged to be actuated by movement of said wall about an axis at right angles to the direction of movement of said wall, said yoke member having a pair of spaced parallel arms extending toward the dial, and an indicator member in the form of a single plate having portions of contrasting colors and carried by the arms of said yoke member for reciprocating movement behind said dial and across the opening thereof so that the movements of said plate are visible through said opening from the front of said casing to give a warning signal.

2. An oxygen flow indicator comprising a casing having a gas inlet, a dial having an opening therein and mounted at the front of said casing, pressure responsive means movably mounted in said casing and comprising a single wall only which is exposed to and actuated by flow of oxygen through said inlet, a yoke member pivotally mounted in said casing and arranged to be actuated by movement of said wall in one direction about an axis at right angles to the direction of movement of said wall, resilient means effective in the absence of oxygen flow to actuate said yoke member in an opposite direction about said axis, and an indicator member in the form of a single plate having portions of contrasting colors carried by said yoke member for reciprocating movement behind said dial and across the opening thereof so that the movements of said plate are visible through said opening from the front of said casing to give a warning signal.

3. In a blinker gauge, a casing, a single pressure responsive wall movably mounted within said casing, means to enable the pressure of a gas to be exerted on said pressure responsive wall to cause movement thereof, a hollow and slotted member connected to said pressure responsive wall for reciprocating movement therewith, an oscillatory member pivotally supported within said slotted member and permitting movement of said slotted member relative thereto, a pin engaged by and movable with said slotted member and connected to said oscillatory member for actuation thereof, a dial having an opening therein and mounted at the front of said casing, and an indicator member in the form of a single plate having portions of contrasting colors carried by said oscillatory member for reciprocating movement behind said dial and across the opening of said dial so that the movements of said plate are visible through said opening from the front of said casing to give a warning signal.

4. In a blinker gauge, a casing having a gas inlet, a dial having an opening therein and mounted at the front of said casing, a cylindrical sub-casing mounted within said first casing and having a single pressure responsive wall at the rear end thereof, the other end of said sub-casing being open and extending towards the dial at the front of said first casing, the outer side of said wall being exposed to the pressure of a gas flowing through said inlet, a slotted member connected to the inner side of said wall for reciprocating movement upon actuation of said wall, a coil spring having one end fixed and the other end attached to said slotted member for moving the latter in a direction opposite to that caused by gas pressure acting on said wall, a yoke member having a pair of spaced parallel arms pivotally supported within said slotted member, a pin engaged by and movable with said slotted member and connected to said yoke member for actuation thereof, and an indicator member in the form of a single plate having portions of contrasting colors and carried by the arms of said yoke member for reciprocating movement behind said dial and across the opening thereof so that the movements of said plate are visible through said opening from the front of said casing to give a warning signal.

5. In a blinker gauge, a casing, a cylinder arranged within said casing, a piston mounted for reciprocating movement within said cylinder, means for conveying the pressure of a gas to be exerted on one side of said piston for actuation thereof, a pivotally mounted yoke member having one end thereof in engagement with the opposite side of said piston, a dial having an opening therein and mounted at the front of said casing, a blinker mechanism comprising a single plate connected to the opposite end of said yoke member for reciprocating movement behind said dial and across the opening of said dial so that the movements of said plate are visible through said opening from the front of said casing to give a warning signal, and means yieldably opposing the movement of said yoke member.

6. In a blinker gauge, a casing, a cylinder arranged within said casing, a piston mounted for reciprocating movement within said cylinder, means for conveying the pressure of a gas to be exerted on one side of said piston for operation thereof, a supporting bracket within said cylinder, a yoke member pivotally mounted on said bracket and having one end thereof in engagement with the opposite side of said piston, a dial having an opening therein and mounted at the front of said casing, a blinker mechanism comprising an indicator plate having portions of contrasting colors and connected to an opposite end of said yoke member for reciprocating movement behind said dial and across the opening in said dial so that movements of said indicator plate are visible through said opening from the front of said casing to give a warning signal, and means yieldingly opposing the movement of said yoke member.

7. In a blinker gauge, a casing having a gas inlet, a dial having an opening therein and mounted at the front of said casing, a cylindrical sub-casing mounted within said first casing and having a single pressure responsive wall at the rear end thereof, the other end of said sub-casing being open and extending towards the dial at the front of said first casing, the outer side of said wall being exposed to the pressure of a gas flowing through said inlet, a hollow and slotted member connected to the inner side of said wall for reciprocating movement upon actuation of said wall, a limit plate supported by said sub-casing, a coil spring having one end abutting said limit plate and the other end thereof abutting said slotted member for moving the latter in a direction opposite to that caused by gas pressure acting on said wall, a yoke member having a pair of spaced parallel arms pivotally supported within said hollow and slotted member permitting movement of said last-named member relative thereto, a pin engaged by and movable with said slotted member and connected to said yoke member for actuation thereof, and an indicator member in the form of a single plate having portions of contrasting colors and carried by the arms of said yoke member for reciprocating movement behind said dial and across the opening thereof so that the movements of said plate are visible through said opening from the front of said casing to give a warning signal.

BRADFORD B. HOLMES.

REFERENCES CITED

The following references are of record in the file of this patent:

UNITED STATES PATENTS

| Number | Name | Date |
|---|---|---|
| 409,375 | Simons | Aug. 20, 1889 |
| 1,227,080 | Schinkez | May 22, 1917 |
| 1,611,659 | Malivert | Dec. 21, 1926 |
| 2,114,105 | Gerber | Apr. 12, 1938 |
| 2,185,971 | Achtel | Feb. 2, 1940 |
| 2,198,888 | Snyder | Apr. 30, 1940 |
| 2,203,147 | Hollmann | June 4, 1940 |
| 2,325,415 | McKinley | July 27, 1943 |
| 2,346,108 | Kendall | Apr. 4, 1944 |
| 2,370,103 | Zapf | Feb. 20, 1945 |